United States Patent
Coppola et al.

(10) Patent No.: US 7,221,490 B2
(45) Date of Patent: May 22, 2007

(54) HOLOGRAPHIC METHOD WITH NUMERICAL RECONSTRUCTION FOR OBTAINING AN IMAGE OF A THREE-DIMENSIONAL OBJECT IN WHICH EVEN POINTS OUT OF THE DEPTH OF FIELD ARE IN FOCUS, AND HOLOGRAPHIC APPARATUS USING SUCH A METHOD

(75) Inventors: Giuseppe Coppola, Arco Felice (IT);
Sergio De Nicola, Arco Felice (IT);
Pietro Ferraro, Arco Felice (IT);
Andrea Finizio, Arco Felice (IT);
Simonetta Grilli, Arco Felice (IT);
Bahram Javidi, Arco Felice (IT);
Giovanni Pierattini, Arco Felice (IT)

(73) Assignee: Consiglio Nazionale Delle Ricerche, Rome (IT)

( * ) Notice: Subject to any disclaimer, the term of this patent is extended or adjusted under 35 U.S.C. 154(b) by 0 days.

(21) Appl. No.: 11/371,010

(22) Filed: Mar. 9, 2006

(65) Prior Publication Data
US 2006/0209370 A1 Sep. 21, 2006

(30) Foreign Application Priority Data
Mar. 16, 2005 (IT) ............... RM2005A0120

(51) Int. Cl.
*G03H 1/02* (2006.01)
(52) U.S. Cl. .................. 359/15; 359/900; 359/32
(58) Field of Classification Search ............ 359/15, 359/900, 9, 19, 32
See application file for complete search history.

(56) References Cited

U.S. PATENT DOCUMENTS

2005/0122549 A1 * 6/2005 Goulanian et al. ............ 359/3
2006/0164703 A1 * 7/2006 Coppola et al. ............. 359/15

OTHER PUBLICATIONS

Schnars Et Al: "Digital recording and numerical reconstruction of holograms", Measurment Science and Technology, IOP Publishing, Bristol, GB, vol. 13, No. 9, Sep. 2002.*

* cited by examiner

*Primary Examiner*—Fayez G. Assaf
(74) *Attorney, Agent, or Firm*—Young & Thompson (57) ABSTRACT

A holographic method with numerical reconstruction for obtaining an image of a three-dimensional object, employs a digitalized hologram of an object or of a portion thereof, and includes starting from the digitalized hologram, extracting a phase image of the object corresponding to a matrix MD of distance values, selecting a subassembly SD of the distance value assembly present in matrix MD, subassembly SD containing distance values $d_k$, extracting from matrix MD an iso-level assembly $IQd_k$ of corresponding bidimensional coordinate of the object; reconstructing, for each distance value $d_k$, a bidimensional matrix $IMd_k$ of intensity values relevant to the object; extracting, from each bidimensional matrix $IMd_k$, a bidimensional $IFd_k$ of intensity values; and starting from the intensity values, reconstructing the three-dimensional intensity image of the object.

39 Claims, 4 Drawing Sheets

HOLOGRAPHIC METHOD WITH NUMERICAL RECONSTRUCTION FOR OBTAINING AN IMAGE OF A THREE-DIMENSIONAL OBJECT IN WHICH EVEN POINTS OUT OF THE DEPTH OF FIELD ARE IN FOCUS, AND HOLOGRAPHIC APPARATUS USING SUCH A METHOD

The present invention relates to a holographic method with numerical reconstruction for obtaining an image of a three-dimensional object in which even points out of the depth of field are in focus, and holographic apparatus using such a method.

Particularly, method according to the present invention uses a single image (digital hologram, from which a phase map and an amplitude map, or an intensity map, can be obtained) obtained by Digital Holography for numerical reconstruction of a single image of an object, the image having many or all the "in focus points" even if not included within the "depth of focus" or "depth of field" of the optical system employed. The invention further relates to a digital holography apparatus, particularly a microscope, using the inventive method. Said method is particularly, but not exclusively, useful in case of an optical configuration of the image acquisition microscope type.

In the geometrical optical field, under "paraxial approximation" conditions, it is possible stating that a thin lens produces on a plane known as "image plane" the image corresponding to a single plane, also known as "object plane".

The object plane can be imagined as an ideal flat surface intersecting the volume occupied by the object.

Two planes so defined are named as "conjugate planes" and the relevant distances pf the lens from the plane are named "conjugate distances". Conjugate distances are legate by a simple mathematical relation depending on a parameter indicated as "focal length" of the thin lens.

Thus, in the above-mentioned ideal case, a single corresponding image plane is obtained for each plane of the object, the points of which are in biunivocal correspondence with the object plane. This means that the lens allows creating a perfectly "in focus" image of one, and of only one, "object plane".

In a not-ideal case, optical systems usually create images permitting focusing not a single plane of the object, but a volume of the same.

The above property of the optical system is defined as "field depth" or "focus depth". It depends on many intrinsic parameters of the optical system, besides on the use conditions of the same.

Field depth thus determines the limits of the object portion, along the longitudinal direction, i.e. along the system optical axis, that will be in focus on the image plane.

Points of the object out of the field depth will appear "out-of-focus" or "non in focus". As a consequence, three-dimensional objects the volume of which has a spatial extension along the optical axis bigger than the field depth of the optical system creating the image will never be completely in focus within a single image.

In other words, once set the optical system properties, in order to create images wherein different parts of the same object at different distances from the optical system (e.g. in the simplest case a converging lens) are in focus, it will be necessary continuously varying the object—optical system distance.

In any case, only the images corresponding to the parts of the object ideally contained within said field or focus depth will be each time in focus.

In the optical field, a mathematical relation defining, as first approximation, the field depth $\delta z$ is the following:

$$\delta z = \frac{\lambda n}{N.A.^2} + \frac{ne}{MN.A.} \quad (1)$$

Wherein, n is the refraction index of the means (in case of air n=1), M is the lateral enlarging, $\lambda$ the wavelength of the luminous radiation employed, N.A. is the numerical aperture of the optical system, and e is the smallest distance that can be measured on the image plane of the optical microscope.

Thus, field depth of optical systems, being the same the other parameters, inversely depends on its numerical aperture. On the other hand, it is known that resolving power of a microscope is proportionally higher with respect to its numerical aperture.

From the above, it descends that the higher is the resolution power, and thus the magnification, the smaller is the field depth. Thus, observing and studying three-dimensional objects, points of the object at different distances of the microscope objective will appear focalised at different distances. This is a serious drawback in case of application requiring focusing at the same time different portions of the same three-dimensional object.

In case of objects characterised by a complex geometrical surface, and for large magnifications, only small parts of the object can be observed clearly and with a sufficient contrast at a set objective—object distance. Observer is thus obliged to continuously varying said distance in order to have a full vision, although at different times, of the surface of the object under examination.

As reported in the scientific literature, two solutions have been suggested in order to overcome said limitation.

An approach, described in article "Extended depth of field through front wave-front coding", E. R. Dowski, and W. T. Cathey, Applied Optics 34, 1859 (1995) and in U.S. Pat. No. 5,748,371, is based on the use of optical elements suitably designed and realised to be provided in the optical apparatus.

Said optical elements are comprised of phase reticules (named "phase optical elements") permitting extending field depth without remarkably increasing exposure time or lighting level.

These phase optical elements, provided in the image acquisition optical system, suitably codify the wave front coming from the observed object so as that resulting images are as more as possible insensible to out of focus effects aiming degrading total visibility of the object to be studied.

A limit of this method is comprised of the fact that these phase optical elements introduce aberration on the image ("blurring") that are partially removed by the use of specific algorithms and software or hardware processing of the signals arriving from a digitalised camera.

Second approach, well known in the literature, is based on the capability of the modern microscopes of acquiring in succession a sequence of images corresponding to different distances of the object and on the following numeral processing of the same in order to obtain a reconstructed image indicated as "with extended focus" or "Extended Focus Image (EFI)".

Modern microscopes are often also provided with cameras and electronic systems for digitalisation and presentation of the image on analog screens and/or digital monitors.

In this case too, it is not possible observing in each one of the obtained images all the details in-focus, since the details are at different distances from the microscope objective and that are out of the field depth of the system.

Furthermore, microscopes are provided with a motion system, usually based on piezoelectric actuators, permitting varying in a controlled manner, and with quite high accuracy and precision, the distance between object and objective.

Particularly, said microscopes are also provided with a control system permitting acquiring and digitalising a sequence of the object images, each one of which corresponds to a well-defined object—objective distance. The two registered images, i.e. the first and the last ones of the sequence under examination, are acquired at distances corresponding to two planes—objects such to completely include the spatial extension along the optical axis of the volume occupied by the object.

In this way, an image sequence is obtained, available in a digital mode for a following numerical processing. Each digital image is comprised of a numerical matrix of N·M elements (pixel), each one of them having a numerical value (usually an 8 bit value), representing its lighting intensity or its colour.

Starting from this image sequence, it is possible realising by a numerical approach a single image (EFI) in which all particulars of the object can be observed "in-focus" applying numerical algorithms well known to those skilled in the art, based on the comparison of "contrast" among sequential images, or other algorithms (see for example R. J. Pieper and A. Korpel, "Image processing for extended depth of field", Applied Optics, 22, 1449 (1983) e K. Itoh, A. Hayashi, and Y. Ichioka, "Digitized optical microscopy with extended depth of field", Applied Optics, 28, 2487 (1989)). Said algorithms permit extracting from each image, in a completely automatic way, groups of elements (pixels) corresponding to portions of the object that are considered as in a better in-focus condition.

However, acting on the contrast, also parts not corresponding to the distance from the investigated observation plane are focused.

Figure 1:
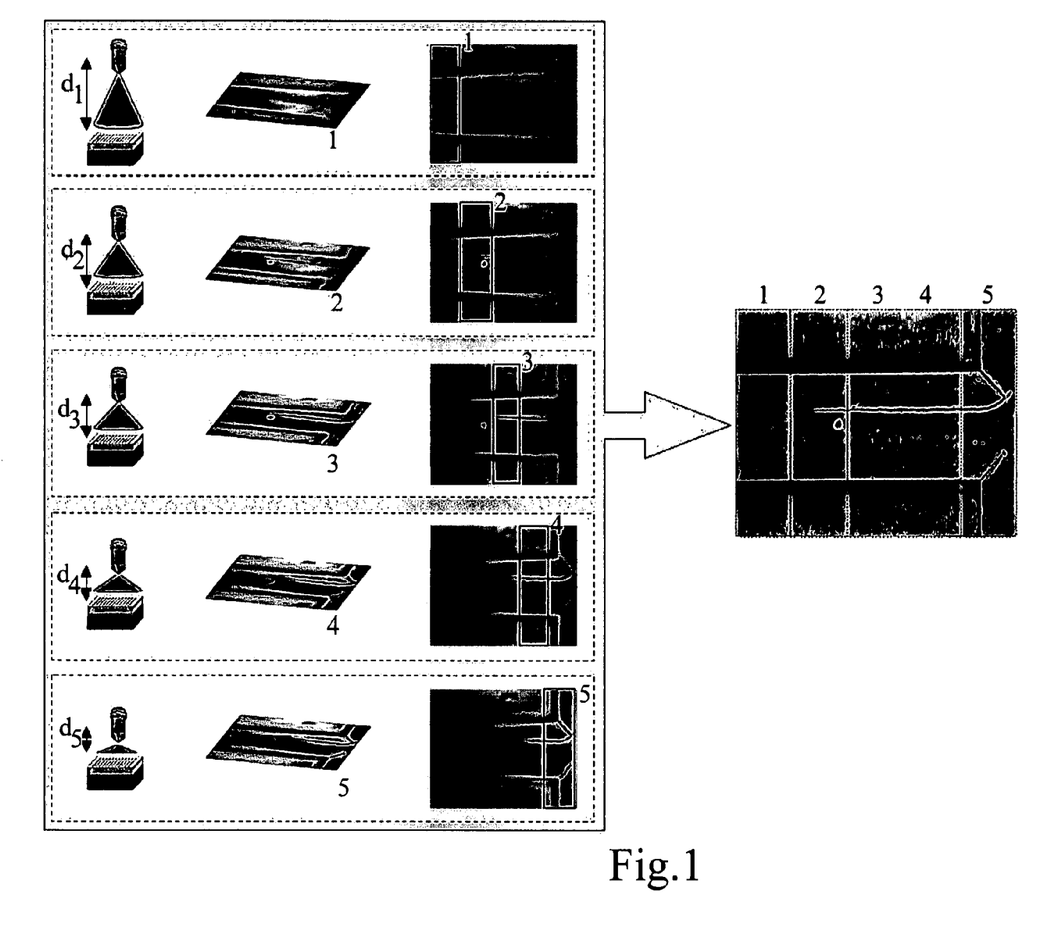
FIG. 1 shows the method steps for reconstruction of an object observed by a microscope according to standard EFI technique.

Making reference to the example shown in FIG. 1, image EFI is constructed reassembling in a single image all the element groups (pixels) extracted from the whole sequence. Only those elements (pixel) of the matrix in which portions of image considered "in-focus" are extracted from each image of the sequence by the numerical algorithms employed. In this way, a numerical matrix wherein all details of the object can be observed "in-focus" comprises EFI image obtained.

A remarkable limit of this method is that it is necessary acquiring a sequence of images corresponding to different distances between object and objective.

It requires an accurate and precise motion apparatus that, however, will have a minimum pitch, e.g. determined by the piezoelectric actuator employed.

In any case, said motion requires some time for carrying out a complete scanning and for acquiring the corresponding images.

Furthermore, during the image scanning and digital acquisition period, it is absolutely necessary that the object under examination is still and does not change its shape, otherwise it would not be possible realising the EFI image.

Now, as it was obvious in many cases when observing organisms or biologic processes, it is not possible ensuring that the object under examination remains still without changing its shape. On the contrary, in many cases it is wished observing the movements of organisms or the dynamic evolution of processes and/or biologic interactions.

At the same way, e.g. in the technological processes for manufacturing of micro-devices in the microelectronic field, it is necessary and/or useful observing the dynamic behaviour of suitable stressed structures. Further, it must be pointed out that the same motion apparatus (either it acts on the microscope objective or on the object bearing plate) can make the sample vibrating, thus disturbing the acquisition procedure of the image sequence and preventing the construction of a correct EFI image.

The same inconvenient occurs in case the microscope vibrates due to a not optimum installation or for any other reason.

The above is not the only limit of the traditional EFI method. In fact, it employs algorithms for construction of images operating on a sequence of images of the object corresponding to a series of planes focused at different distances. These algorithms operate by procedures that can be substantially exemplified in two different staged: recognition and reconstruction.

First numerical phase is dedicated at processing and identification in each image of sequences of different portions of the object that are in a best "in-focus" condition.

Second construction phase is instead dedicated at extraction of said image portions (pixel groups) and at their assembling for realising EFI image.

More complex and problematic phase is the first one, relevant to recognition of "in-focus" zones, since recognition of a portion of an image in-focus highly depends on the algorithm employed and on the kind of image. In fact, in-focus definition is not univocally determined under the numerical—mathematical point of view.

It is object of the invention that of providing a holographic method with numerical reconstruction permitting overcoming the drawbacks and solving the problems of the prior art.

It is further object of the present invention that of providing apparatuses and instruments necessary for carrying out the method according to the invention.

Furthermore, it is specific object of the present invention a holographic apparatus, particularly a microscope, employing the method according to the invention.

It is therefore specific object of the present invention a holographic method with numerical reconstruction for obtaining an image of a three-dimensional object, said method employing a digitalised hologram of an object or of a portion of an object, and being characterised in that it comprises the following steps:

A. starting from the digitalised hologram, extracting an phase image of said object of portion of object, the image corresponding to a matrix MD of distance values, said distance values corresponding to distances from the image plane or to the depths relevant to said object or object portion;

B. selecting a subassembly SD of the distance value assembly present in matrix MD of the method step A, subassembly SD containing distance values $d_k$, with k_having a value between 1 and a whole number $N_{SD} > 1$;

C. for each distance value $d_k$, extracting from matrix MD an iso-level assembly $IQd_k$ of corresponding bidimensional coordinate of said object or object portion;

D. for each distance value $d_k$, reconstructing, starting from the digitalised hologram, a bidimensional matrix $IMd_k$ of intensity values relevant to said object or object portion;

E. extracting, from each bidimensional matrix $IMd_k$ of the method step D, a bidimensional $IFd_k$ of intensity values corresponding to the bidimensional coordinates of the iso-level assembly $IQd_k$ extracted in method step C;

F. starting from intensity values of said $IFd_k$ assemblies of the method phase E, from the coordinate bidimensional of the iso-level assembly $IQd_k$ and from the relevant distance values $d_k$, for all values of k between 1 and $N_{SD}$, reconstructing the three-dimensional intensity image of said object or object portion;

resolution of bidimensional matrix $IMd_k$ for all values of k between 1 and $N_{SD}$ being identical to the resolution of matrix MD of distance value.

According to the invention, in step A said one-phase image can be obtained using two or more phase images reconstructed starting from the same digital hologram for different distance values.

According to the invention, method step A can be carried out using the convolution method.

According to the invention, the method step D can be carried out using the convolution method.

According to the invention, method A step can be carried out employing Fresnel method.

According to the invention, when the digitalised hologram is comprised of a number $V_r$ of intensity values corresponding to an equivalent number of elementary sub-images or "pixel" of the holographic image, pixel dimensions corresponding to sampling intervals of the holographic image, the method can comprise, in its step A for obtaining said one phase image, a first processing sub-step A.1 of the matrix of the digitalised hologram, and a second reconstruction sub-phase A.2 in the complex plane of the hologram starting from the digitalised hologram processed during the first sub-step A.1, the method being characterised in that the second sub-step A.2 is carried out by discrete Fresnel transform starting from a value matrix $V_e$, comprising said $V_r$ values, as well as a whole number $p=V_e-V_r>0$ having constant value corresponding to OS, corresponding to the same number of pixel having the same dimensions of the other ones.

Preferably, according to the invention, said p constant values are null values (OS=0).

Preferably, according to the invention, said p constant values are values different from 0 (OS not 0).

Advantageously according to the opinion, said p values are outside said $V_r$ value matrix.

Advantageously according to the opinion, said p values are arranged symmetrically.

Advantageously according to the opinion, said p values are arranged asymmetrically.

Preferably, according to the invention, said value $V_e$ number is inversely proportional with respect to the pixel dimension that it is wished obtaining for said phase image MD.

Preferably, according to the invention, digitalised hologram is a rectangular matrix of $V_r=N_r \cdot M_r$ values, each value corresponding to a square pixel of $\Delta x$, $\Delta y$ dimensions.

Preferably, according to the invention, hologram reconstructed during step A.2 is represented by a rectangular matrix of $V_e=N_e M_e$ values, each value corresponding to a square pixel of $\Delta\xi=(\lambda d/N_e\Delta x)$ and $\Delta\eta=(\lambda d/M_e\Delta y)$, $\lambda$ being the wavelength of the wave bundle impinging the object of which the hologram is registered, and d the distance between the sensing device and the object of which the hologram is registered, $\Delta\xi$ and $\Delta\eta$ being sample intervals of the reconstructed holographic image.

Advantageously, according the invention $N_e=(\lambda d/\Delta x^2)$, $M_e=(\lambda d/\Delta y^2)$, $\Delta\xi=\Delta x$, $\Delta\eta=\Delta y$.

Advantageously, according to the invention, after a second sub-step A.2, if each sample interval of the holographic image is not equal or lower to a set threshold, number of values p added to the digitalised hologram matrix is increased, and the second step is again carried out.

Advantageously, according to the invention, said threshold is set in function of the signal/noise ratio of the holographic image.

Preferably, according to the invention, method step D is carried out employing Fresnel method.

Preferably, according to the invention, when the digitalised hologram is comprised of a number $V_r$ of intensity values corresponding to an equivalent number of elementary sub-images or "pixel" of the holographic image, pixel dimensions corresponding to sampling intervals of the holographic image, the method step D comprises a first processing sub-step D.1 of the matrix of the digitalised hologram, and a second reconstruction sub-phase D.2 for each $d_k$ value, with k comprised between 1 and $N_{SD}$, in the complex plane of the hologram starting from the digitalised hologram processed during the first sub-step D.1, the second sub-step D.2 being carried out by discrete Fresnel transform starting from a value matrix $V_e^k$, comprising said $V_r$ values, as well as a whole number $p_k=V_e^k-V_r>0$ having constant value corresponding to $OS_k$, corresponding to the same number of pixel having the same dimensions of the other ones, said whole number $p_k$ being function of the $d_k$ distance for each bidimensional matrix $IMd_k$, in such a way that resolution of each bidimensional matrix $IMd_k$ is identical to the resolution of the MD matrix of distance values.

Preferably, according to the invention, said whole number $p_k$ is directly proportional to distance $d_k$.

Advantageously according to the invention, said constant values $p_k$ for one or more k whole numbers between 1 and $N_{SD}$ are null values ($OS_k=0$).

Advantageously, according to the invention, said constant values $p_k$ for one or more k whole numbers between 1 and $N_{SD}$ are not null values ($OS_k$ different from 0).

Advantageously, according to the invention, said $p_k$ values are outside said $V_r$ values matrix.

Advantageously, according to the invention, said $p_k$ values are arranged symmetrically.

Advantageously, according to the invention, said $p_k$ values are arranged asymmetrically.

Preferably, according to the invention, said number of $V_e^k$ values is inversely proportional to the pixel dimension of the pixel to be obtained for $IMd_k$ images reconstructed for all values of k between 1 and $N_{SD}$.

Preferably, according to the invention, digitalised hologram is a rectangular matrix of $V_r=N_r \cdot M_r$ values, each value corresponding to a rectangular pixel having $\Delta x$, $\Delta y$ dimensions.

Preferably, according to the invention, hologram reconstructed in second sub-step D.2 is represented by a square matrix of $V_r^k=N_r^k \cdot M_r^k$ values, each value corresponding to a rectangular pixel having set constant dimensions $\Delta\xi=(\lambda d/N_e^k\Delta x)$ and $\Delta\eta=(\lambda d/M_e^k\Delta y)$, $\lambda$ being the wavelength of the wave bundle impinging the object of which the hologram is registered, and $d_k$ the distance between the sensing device and the object of which the hologram is registered, $\Delta\xi$ and $\Delta\eta$ being sample intervals of the reconstructed holographic image $IMd_k$ for all k values between 1 and $N_{SD}$.

Preferably, according to the invention, $N_{SD}>2$.

Preferably, according to the invention, $N_{SD}$ is set on the basis of the minimum resolution of the holographic apparatus by which the digitalised hologram is obtained.

Advantageously, according to the invention, aberrations have beforehand eliminated from said digitalised hologram by numerical processing.

Advantageously, according to the invention, a reference-digitalised hologram has been beforehand subtracted from said digitalised hologram.

Preferably, according to the invention, said reference digitalised hologram is the hologram of a flat surface registered under the same conditions of registration of the hologram of said at least one object portion.

Advantageously, according to the invention, method is carried out simultaneously for more than one object portion.

Advantageously, according to the invention, resolution of MD matrix of at least one of said more than one portion is different from at least one of the resolutions of the other corresponding MD matrixes.

Preferably, according to the invention, A, B, C, D, E, F, method steps are repeated for more than one wavelength of the light used for obtaining digitalised hologram, or equivalently for two or more digitalised hologram obtained at different wavelengths, resolution of all bidimensional matrix $IMd_k$ for each digitalised hologram and for all values of k between 1 and $N_{SD}$, being identical to the MD matrix resolution of distance values, MD matrix being extracted starting from at least one of the digitalised holograms corresponding to said different wavelengths, three-dimensional intensity images of said object or of said object portion being the juxtaposition of the three-dimensional images reconstructed starting from said more than one digitalised holograms.

Juxtaposition can be realised employing an RGB technique or a wavelet technique, as described in article "Three-dimensional image fusion by use of multi wave length digital holography", B. Javidi, P. Ferraro, S. Hong, S. De Nicola, A. Finizio, D. Alfieri, G. Pierattini, 144 *Optics Letters*/Vol. 30, No. 2/Jan. 15, 2005.

It is further specific object of the present invention a computer program characterised in that it comprises code means suitable to execute, when operating on a processor, method according to the invention.

It is still specific object of the present invention a memory support readable by a processor, having a program memorized, characterised in that the program is the computer program according to the invention.

Furthermore, it is specific object of the present invention an apparatus for revealing holographic images, particularly a holographic microscope, comprising a unit for processing the digitalised hologram, characterised in that the processing unit processes data revealed employing the method according to the invention.

The present invention will be now described, for illustrative but not limitative purposes, according to its preferred embodiments, with particular reference to the figures of the enclosed drawings, wherein.

Interferometric technique permitting recording and reconstructing the reflected complex field (amplitude and phase), transmitted and/or diffused by an object is usually named in the scientific literature as "Digital Holography", that in the following will be indicated by acronym DH (see for example articles "Controlling image size as a function of distance and wavelength in Fresnel-transform reconstruction of digital holograms", P. Ferraro, S. De Nicola, G. Coppola, A. Finizio, D. Alfieri, and G. Pierattini, *Optics Letters* 29, 854–856 (2004); "A digital holographic microscope for complete characterization of microelectromechanical systems", G. Coppola, P. Ferraro, M. Iodice, S. De Nicola, A. Finizio, and S. Grilli, *Measurement Science and Technology* 15, 529–539 (2004); "Controlling images parameters in the reconstruction process of digital holograms, P. Ferraro, G. Coppola, D. Alfieri, S. De Nicola, A. Finizio, and G. Pierattini, *IEEE Journal of Selected Topics in Quantum Electronics* 10, 829–839 (2004); "Recovering image resolution in reconstructing digital off-axis holograms by Fresnel-transform method", P. Ferraro, S. De Nicola, A. Finizio, G. Pierattini, and G. Coppola, *Applied Physics Letters* 85, 2709–2711 (2004)).

It is indicated as "Digital Holography" an interference figure recorder by an integrated matrix of radiation sensors.

Different methods exit permitting numerical reconstruction of the complex field starting from the hologram and particularly "convolution" method and "Fresnel" method.

As it is known, particularly, in Fresnel method, spatial resolution of the complex field (comprising amplitude and phase) is determined by some parameters. Some of these parameters are determined by the features of the integrated matrix of radiation sensors and particularly of the number of elements comprising the matrix and of the dimension of the single element. Instead, other parameters are reconstruction distance, determined by the d distance of the object (or points of its surface or volume) and the λ wavelength of the lighting source employed for creating the hologram.

Usually, in the literature, spatial resolution defined by the "reconstruction pixel" indicated as a wavelength and that will be indicated in the following by the acronym PR. Dimensions of bidimensional PR, Δξ along axis x and Δη along axis y depend on the above mentioned parameter by the following mathematical relations:

$$\Delta \xi = \frac{\lambda d}{N \Delta x} \qquad \text{formula (2)}$$

$$\Delta \eta = \frac{\lambda d}{M \Delta y}$$

Wherein, M is the number of pixels acquired (by an image acquisition device) along axis x, N is the number of pixels along axis y, Δx and Δy are dimensions of pixels according to the two directions of axes x and y.

From the above relation, it is well evident that the complex field at different distances, being the other parameters the same, will have a PR value different, and particularly PR dimension will increase when the reconstruction distance increases. In this case, spatial resolution, by which complex field has been reconstructed, will have a lower spatial resolution. On the contrary, spatial resolution will be higher at a lower reconstruction distance, since in this case PR dimension diminishes.

For example, in case of objects observed under reflection, having a three-dimensional profile, when reconstructing amplitude (or intensity) obtained from hologram will not appear completely "in-focus", since reconstruction occurs along a single plane at a d distance from the hologram recording opto-electronic sensor (typically a CCD camera).

According to the invention, it is instead possible numerical reconstruction of the whole volume within which the object lies starting from a single image (digital hologram). This is possible constructing hologram for different distances within which all the object points are included, and using the phase map obtained at a single distance, for extracting the three-dimensional profile fully in-focus. It must be pointed out that to this end it is sufficient using a single-phase map for extracting the three-dimensional profile fully in-focus. In fact, although the phase map has been reconstructed at a single distance, it in any case describes a sufficiently precise three-dimensional profile of the object.

In any case, it is also possible, if necessary, employing more than one phase maps obtained at different distances or combinations of the same in order to obtain a more accurate definition of the profile. By "combination" it is for example meant an average of a plurality of maps, or the juxtaposition of map portions reconstructed at different distances, choosing each time portions having a better definition.

In order to reconstructing the intensity figure at different distances, it can be used a reconstruction method known as "convolution method", described in the literature by the scientific publication "Whole optical wave fields reconstruction by digital holography", S. Grilli, P. Ferraro, S. De Nicola, A. Finizio, G. Pierattini, and R. Meucci, *Optics Express* 9, 294–302 (2001); object amplitude or intensity images reconstructed at different distances have the same dimension.

As an alternative, according to the invention, it is possible employing the above-mentioned Fresnel method, having a more general application and many advantages.

Figure 2:
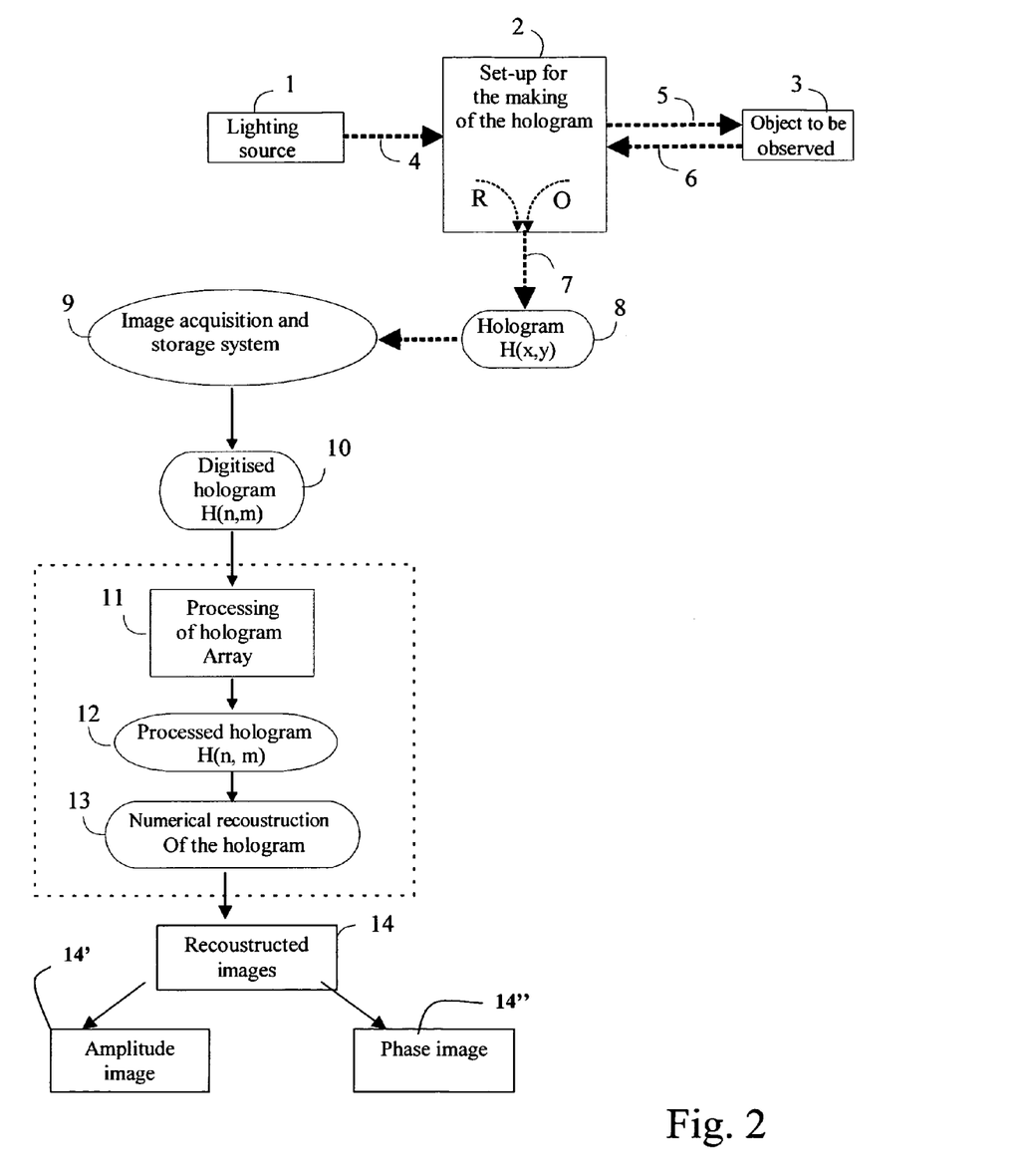
FIG. 2 shows a hybrid block diagram and flow chart of the traditional holographic reconstruction method.

In Fresnel method, making reference to FIG. 2, a preparation unit for the hologram acquisition conditions or "set-up" 2 collects radiation 4 arriving from a source 1 and lightens by radiation 5 the object 3 under examination. Further, said set-up 2 provides a device for creating a reflected ray 6, transmitted or diffused by the object 3, an object beam O and a device for creating a reference beam R. object beam O and reference beam R are combined within set-up 2 so as to create an interference distribution 7 along a plane. Said interference creates a hologram 8 of the object under examination.

Here it is necessary specifying that, since Fresnel approach interests only the wavelength of the radiation impinging on the object, method according to the present invention is not limited to the optical field and can be applied for numerical reconstruction of holograms registered by every kind of electromagnetic radiation (e.g. X rays) and not electromagnetic radiation (e.g. electron beams and/or acoustic waves). Particularly, source 1 could be constructed by a combination of two or more wavelengths. Due to the above reason, nature, wavelength and coherence of source 1 could be of any kind.

Hologram 8 is acquired, digitalised and memorized by an acquisition method 9 each kind of image acquisition system existing or that will be developed in the future can be used to this end.

Inside the acquisition system 9 it is provided a device for digitalisation and memorisation on a computer of the acquired image 8. Digitalised image is named "digital hologram" 10 and it is described by a matrix COPIARE of N·M numbers, obtained by the spatial bidimensional sampling of hologram 8 H(x,y).

For a perfect reconstruction of the object image, it is necessary that the digitalisation process satisfies the sampling theorem. Particularly, it must be satisfied condition that spacing between fringes of the interference distribution 7 is higher than at least two pixels of the acquisition system 9. Thus, sampling theorem imposes minimum resolution that it is possible obtaining by an experimental datum 2.

One of the remarkable advantages obtained by the digital holography is that it is possible acting directly on the digitalised hologram of object 3, in order to carrying out operation on the acquired information.

The above means that it is possible making different processing on the digitalised hologram for processing the images 11 by said processing it is for example possible eliminating the zero diffraction order of the hologram reconstruction, or eliminating one "phase aberration" induced by the optical system employed.

By the "phase aberration" it is meant a deformation of the front wave travelling through the hologram creation and registration system. Phase aberration correction compensates said deformations permitting obtaining a correct reconstruction of the observed object.

Object numerical reconstruction process 13 under observation is based on two steps. During first step, "processed" digitalised hologram H(n,m) 12 must be multiplied for a digitalised replica of the reference beam R, obtaining a field distribution F(n, m) from which it is possible obtaining the image of the object under examination.

Second step of the propagation process is the propagation of the field distribution F(n, m) from the plane on which the camera is provided to the observation plane or image plane. This process brings to the reconstructed image 14.

Reconstructed image 14 can be an amplitude image 14' and/or a phase image 14" (obtained both with convolution and Fresnel method).

Phase image 14" shows the object profile, and thus provides all data relevant to the distances of the various points of the object from the observation plane.

In fact, Digital Holography (DH) is able providing map (or three-dimensional profile) of an object, for example by reflection, through the reconstruction of optical phase as described in the following scientific publications: "Surface topography of microstructures in lithium niobate by digital holographic microscopy", S. De Nicola, P. Ferraro, A. Finizio, S. Grilli, G. Coppola, M. Iodice, P. De Natale, and M. Chiarini, *Measurement Science and Technology* 15, 961–968 (2004); "A digital holographic microscope for complete characterization of microelectromechanical systems", G. Coppola, P. Ferraro, M. Iodice, S. De Nicola, A. Finizio, and S. Grilli, *Measurement Science and Technology* 15, 529–539 (2004).

Phase map can be thus obtained or by a single digital hologram by the procedures indicated in article "Compensation of the inherent wave front curvature in digital holographic coherent microscopy for quantitative phase-contrast imaging, P. Ferraro, S. De Nicola, A. Finizio, G. Coppola, S. Grilli, C. Magro, and G. Pierattini *Applied Optics* 42, 1938–1946 (2003), or by reconstruction of two digital holograms by the holographic interferometry.

In fact, in some applications, Digital Holography (DH) is used in order to analyse variations of the object under observation caused by an outer action (for example force, pressure, and temperature variation). Variations are measured according to a quantitative mode subtracting the phase maps of two holograms registered with the object in two different conditions (for example before and after the outer perturbation action). This technique is named Digital Holographic Interferometry.

In the Digital Holographic Interferometry applied in order to obtain the 3D profile of the object, a flat surface hologram registered under the same circumstances of the object hologram is used as reference hologram (see for example article "Compensation of the inherent wave front curvature in digital holographic coherent microscopy for quantitative phase-contrast imaging P. Ferraro, S. De Nicola, A. Finizio, G. Coppola, S. Grilli, C. Magro, and G. Pierattini *Applied Optics* 42, 1938–1946 (2003)).

From the above phase map 14" it is possible obtaining distance map of the different points of the object d (x, y) by the simple relation:

$$d(x,y)=\phi(x, y)*\lambda/4\pi$$

wherein phase is obtained by:

$$\phi(x, y)=(4\pi/\lambda)OPD(x, y)$$

and wherein OPD is the "Optical Path Difference" with respect to an arbitrary reference plane.

Now, it is possible knowing which are the different planes in which the different points of the object are.

Method according to the invention employs the information about the distances of the various points of the object from the observation point.

Figure 3:
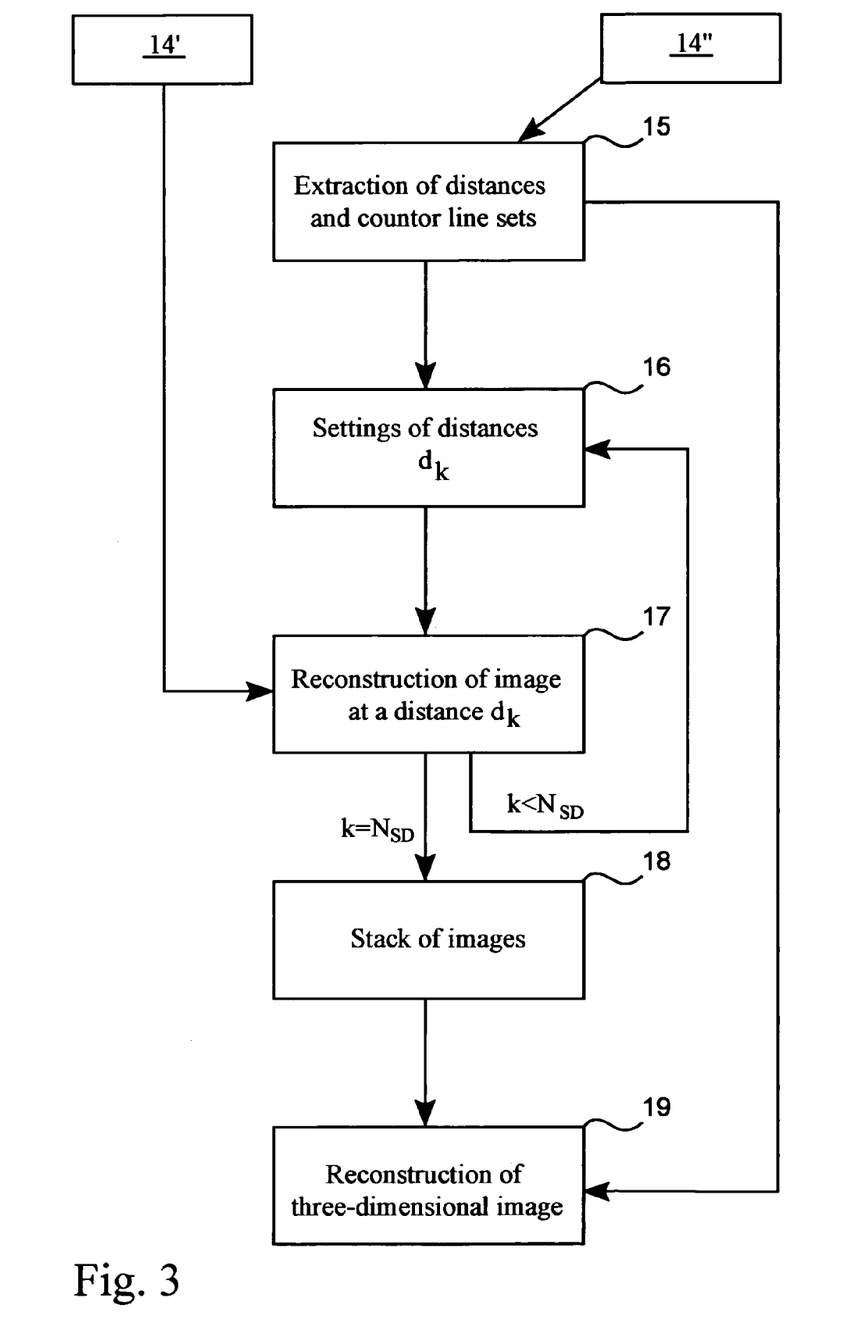
FIG. 3 shows a flow chart of the holographic method with numerical reconstruction according to the invention.

Making reference to FIG. 3, by the method according to the invention it is possible obtaining an image wherein also points of the revealed object are in-focus that are beyond the focus depth.

In fact, once obtained phase map 14", different method steps are carried out, bringing to this result. An example of succession of method steps according to the invention is illustrated in the following.

First, in step 15 according to the invention, various d reconstruction distances are extracted on the basis of the object as obtained in phase map 14", along with the iso-level coordinate assembly for each distance.

Now, distance $d_k$ from the observation plane is set in a following step 16, within the limit obtained from the above phase map14", and set distance $d_k$ image is reconstructed in a subsequent phase 17, using the method controlling dimension (and/or resolution) described in scientific article "Controlling images parameters in the reconstruction process of digital holograms", P. Ferraro, G. Coppola, D. Alfieri, S. De Nicola, A. Finizio, and G. Pierattini, *IEEE Journal of Selected Topics in Quantum Electronics* 10, 829–839 (2004) and in the International Patent Application PCT/IT04/000380.

The above procedure is repeated for different distances (k included between 1 and $N_{SD}$>1) from the observation plane, thus obtaining a "stack" 18 of images reconstructed at different distances and having comparable dimensions. This stack represents all or part of the volume wherein the object is contained, and thus it is possible, if wished, going beyond the field depth.

In other words, once carried out the reconstruction according to the invention starting from a single digital hologram, a series of object images are available, said object being reconstructed at different distances d of the same object from the observation plane.

It must be noted that, contrary to the case when different images are acquired by a mechanical motion of the shooting apparatus (for example by a microscope), the only limit to the number of distances at which the image is reconstructed (and thus of the number of final images) is given by the minimum resolution that can be obtained by a single holographic apparatus, since it is only a numerical reconstruction.

After having used the above image dimension and/or resolution control and/or modification method, it is possible applying the method usually employed for construction of an EFI image, i.e. selection of a region in-focus of the object for every image of the stack obtained, and the subsequent reconstruction of the final image of the object having all the points "in-focus".

In the above two cases it is evident the great advantage of the method suggested according to the present invention: it is possible making the reconstruction of an EFI image of an object without making any scanning (thus it is not necessary making an acquisition of a sequence of images with well evident advantages), but making a series of numerical reconstructions starting from a single image (digital hologram).

In other words, the image sequence is obtained from which the EFI image is extracted by an only numerical procedure exploiting the reconstruction properties at different distances of the digital hologram. In this way, it is possible avoiding every mechanical scanning for varying the object—objective distance from the microscope, thus reducing observation time and permitting obtaining EFI images also for objects suffer dynamic variations and thus not permitting recording an image sequence during e mechanical scanning.

As already said, it is also possible using two starting holograms in the method according to the invention. This is not necessary, but advantageous in order to eliminate aberrations, this being also possible also numerically starting from a single hologram.

It is also possible another embodiment of the method according to the invention.

In fact, it must be put into evidence that holographic phase map 14" comprises a three-dimensional profile of the object under examination.

In this way, having a three-dimensional profile for construction of EFI image it is possible making volume within which object is included, said volume being comprised of the stack of amplitude images reconstructed at different distances, intersecting in step 19 with the profile map, or selecting amplitude values for each image of the stack corresponding to the above bidimensional coordinate iso-level assemblies.

EFI image is thus obtained constructing a single image comprised of the pixel assembly of the amplitude images intersecting object three-dimensional phase profile. Obviously, EFI image will be as more accurate as the amplitude images reconstructed at different distances.

It is clear that direct intersection is possible only among images having the same resolution and dimension. This is the reason why it is employed the resolution modification method according to International Patent Application No. PCT/IT04/000380 and in the Italian Patent Application RM2003A000398 (particularly in step 17 of FIG. 3).

It must be still noted an advantage of the method according to the present invention, i.e. possibility (not possible in the traditional EFI method) of increasing the resolution on single portions of the revealed object, thanks to the selective use of the dimension and/or resolution control method mentioned in the above.

Figure 4:
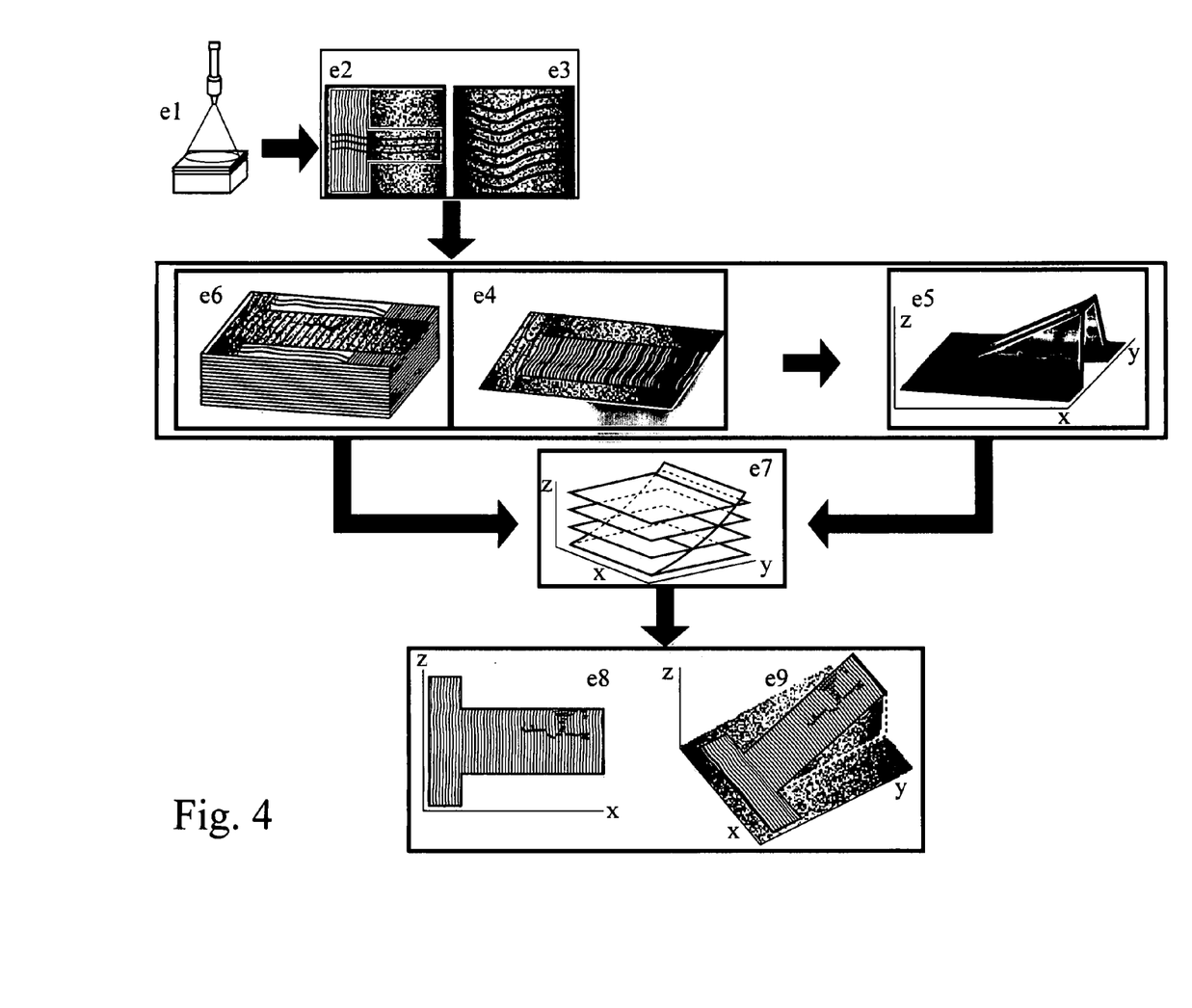
FIG. 4 shows the flow-chart of the method according to the invention with images taken from a particular reconstruction example.

Two embodiments of the method according to the invention are shown in FIG. 4, for reconstruction of a microscopic object having a ramp shape along one deformation.

An object hologram is acquired by apparatus e1. Starting from digitalised hologram e2 of the object and possibly a reference hologram e3 of the object (digitalised hologram of the reference plane), it is obtained stack of amplitude images e6, varying the reconstruction distance and controlling dimension of images.

Thus, from stack e6 it is possible passing to the bidimensional reconstruction e8 of the in-focus object.

As an alternative, or in addition, it is possible employing object phase map e4 for extracting the three-dimensional profile e5 of the same object.

Then, stack e6 is intersected with profile e5 in order to obtain the three-dimensional image e9 fully in-focus.

As already seen, method described in the present invention permits passing the limitations of the two methods according to the prior art described in the above.

In fact, by the present method, it is possible reconstructing an EFI image starting from a single acquired image of a single digital hologram (or, at most, for advantageously improving precision, two images of two digital holograms), thus avoiding making an acquisition of an image sequence at different distances. Method can further be applied without the needing of designing, realising and using suitable optical elements.

EFI image obtained by the method according to the invention is three-dimensional. An important difference with respect to the image obtained by the traditional EFI image is that the latter is reconstructed starting from few known distances of the observation plane from the observed object, thus requiring an interpolation jeopardising precision and quality; on the contrary, method according to the invention permits employing such a high number of distances making it not necessary an interpolation, thus being the image obtained by the method according to the invention highly precise and with a very high quality.

Method is applied by the reconstruction of digital holograms registered by a digital holographic interferometer with a microscope configuration.

More particularly, method according to the present invention permits, by the digital registration on one or at most two images on the plane of a bi-dimensional matrix of optical sensors.

Method according to the present invention can be applied in all the industrial and technological fields providing the use of optical instruments and for which it is necessary obtaining in a single image many, or all details of an object, visible and in-focus, even if said details are not in the "focus depth" or "field depth" of the optical system employed.

It must be clear that the method can be applied also to the sole points included in the field depth with a remarkable improvement of the image quality with respect to what can be obtained by the traditional methods.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. Holographic method with numerical reconstruction for obtaining an image of a three-dimensional object, said method employing a digitalised hologram of an object or of a portion of an object, and being characterised in that it comprises the following steps:
   A. starting from the digitalised hologram, extracting an phase image of said object of portion of object, the image corresponding to a matrix MD of distance values, said distance values corresponding to distances from the image plane or to the depths relevant to said object or object portion;
   B. selecting a subassembly SD of the distance value assembly present in matrix MD of the method step A, subassembly SD containing distance values $d_k$, with k_having a value between 1 and a whole number $N_{SD}>1$;
   C. for each distance value $d_k$, extracting from matrix MD a iso-level assembly $IQd_k$ of corresponding bidimensional coordinate of said object or object portion;
   D. for each distance value $d_k$, reconstructing, starting from the digitalised hologram, a bidimensional matrix $IMd_k$ of intensity values relevant to said object or object portion;
   E. extracting, from each bidimensional matrix $IMd_k$ of the method step D, a bidimensional $IFd_k$ of intensity values corresponding to the bidimensional coordinates of the iso-level assembly $IQd_k$ extracted in method step C;
   F. starting from intensity values of said $IFd_k$ assemblies of the method phase E, from the coordinate bidimensional of the iso-level assembly $IQd_k$ and from the relevant distance values $d_k$, for all values of k between 1 and $N_{SD}$, reconstructing the three-dimensional intensity image of said object or object portion;

resolution of bidimensional matrix $IMd_k$ for all values of k between 1 and $N_{SD}$ being identical to the resolution of matrix MD of distance value.

2. Method according to claim 1, characterised in that in step A said one phase image is obtained using two or more phase images reconstructed starting from the same digital hologram for different distance values.

3. Method according to claim 1, characterised in that method step A is carried out using the convolution method.

4. Method according to claim 1, characterised in that method step D is carried out using the convolution method.

5. Method according to claim 1, characterised in that method A step is carried out employing Fresnel method.

6. Method according to claim 5, characterised in that, when the digitalised hologram is comprised of a number $V_r$ of intensity values corresponding to an equivalent number of elementary sub-images or pixel of the holographic image, pixel dimensions corresponding to sampling intervals of the holographic image, the method can comprise, in its step A for obtaining said one phase image, a first processing sub-step A.1 of the matrix of the digitalised hologram, and a second reconstruction sub-phase A.2 in the complex plane of the hologram starting from the digitalised hologram processed during the first sub-step A.1, the method being characterised in that the second sub-step A.2 is carried out by discrete Fresnel transform starting from a value matrix $V_e$, comprising said $V_r$ values, as well as a whole number $p=V_e-V_r>0$ having constant value, corresponding to the same number of pixel having the same dimensions of the other ones.

7. Method according to claim 6, characterised in that said p constant values are null values.

8. Method according to claim 6, characterised in that said p constant values are values different from 0.

9. Method according to claim 6, characterised in that said value $V_e$ number is inversely proportional with respect to the pixel dimension that it is wished obtaining for said phase image MD.

10. Method according to claim 6, characterised in that digitalised hologram is a rectangular matrix of $V_r=N_rM_r$ values, each value corresponding to a square pixel of $\Delta x, \Delta y$ dimensions.

11. Method according to claim 10, characterised in that hologram reconstructed during step A.2 is represented by a rectangular matrix of $V_e=N_eM_e$ values, each value corresponding to a square pixel of $\Delta\xi=(\lambda d/N_e\Delta x)$ and $\Delta\eta=(\lambda d/M_e\Delta y)$, $\lambda$ being the wavelength of the wave bundle impinging the object of which the hologram is registered, and d the distance between the sensing device and the object of which the hologram is registered, $\Delta\xi$ and $\Delta\eta$ being sample intervals of the reconstructed holographic image.

12. Method according to claim 11, characterised in that $N_e=(\lambda d/\Delta x^2)$, $M_e=(\lambda d/\Delta y^2)$, $\Delta\xi=\Delta x$, $\Delta\eta=\Delta y$.

13. Method according to claim 6, characterised in that after a second sub-step A.2, if each sample interval of the holographic image is not equal or lower to a set threshold, number of values p added to the digitalised hologram matrix is increased, and the second step is again carried out.

14. Method according to claim 13, characterised in that said threshold is set in function of the signal/noise ratio of the holographic image.

15. Method according to claim 6, characterised in that method step D is carried out employing Fresnel method.

16. Method according to claim 15, characterised in that, when the digitalised hologram is comprised of a number $V_r$ of intensity values corresponding to an equivalent number of elementary sub-images or "pixel" of the holographic image, pixel dimensions corresponding to sampling intervals of the holographic image, the method step D comprises a first processing sub-step D.1 of the matrix of the digitalised hologram, and a second reconstruction sub-phase D.2 for each $d_k$ value, with k comprised between 1 and $N_{SD}$, in the complex plane of the hologram starting from the digitalised hologram processed during the first sub-step D.1, the second sub-step D.2 being carried out by discrete Fresnel transform starting from a value matrix $V_e^k$, comprising said $V_r$ values, as well as a whole number $p_k=V_e^k-V_r>0$ having constant value, corresponding to the same number of pixel having the same dimensions of the other ones, said whole number $p_k$ being function of the $d_k$ distance for each bidimensional matrix $IMd_k$, in such a way that resolution of each bidimensional matrix $IMd_k$, is identical to the resolution of the MD matrix of distance values.

17. Method according to claim 16, characterised in that said whole number $p_k$ is directly proportional to distance $d_k$.

18. Method according to claim 16, characterised in that Advantageously according to the invention, said constant values $p_k$ for one or more k whole numbers between 1 and $N_{SD}$ are null values.

19. Method according to claim 16, characterised in that said constant values $p_k$ for one or more k whole numbers between 1 and $N_{SD}$ are not null values.

20. Method according to claim 16, characterised in that said $p_k$ values are outside said $V_r$ values matrix.

21. Method according to claim 20, characterised in that said $p_k$ values are arranged symmetrically.

22. Method according to claim 20, characterised in that said $p_k$ values are arranged asymmetrically.

23. Method according to claim 16, characterised in that said number of $V_e^k$ values is inversely proportional to the pixel dimension of the pixel to be obtained for $IMd_k$ images reconstructed for all values of k between 1 and $N_{SD}$.

24. Method according to claim 16, characterised in that digitalised hologram is a rectangular matrix of $V_r=N_r \cdot M_r$ values, each value corresponding to a rectangular pixel having $\Delta x$, $\Delta y$ dimensions.

25. Method according to claim 24, characterised in that hologram reconstructed in second sub-step D.2 is represented by a square matrix of $V_r^k=N_r^k \cdot M_r^k$ values, each value corresponding to a rectangular pixel having set constant dimensions $\Delta\xi=(\lambda d/N_e^k \Delta x)$ and $\Delta\eta=(\lambda d/M_e^k \Delta y)$, $\lambda$ being the wavelength of the wave bundle impinging the object of which the hologram is registered, and $d_k$ the distance between the sensing device and the object of which the hologram is registered, $\Delta\xi$ and $\Delta\eta$ being sample intervals of the reconstructed holographic image $IMd_k$ for all k values between 1 and $N_{SD}$.

26. Method according to claim 1, characterised in that said p values are outside said $V_r$ value matrix.

27. Method according to claim 26, characterised in that said p values are arranged symmetrically.

28. Method according to claim 27, characterised in that said p values are arranged asymmetrically.

29. Method according to claim 1, characterised in that $N_{SD}>2$.

30. Method according to claim 29, characterised in that $N_{sp}$ is set on the basis of the minimum resolution of the holographic apparatus by which the digitalised hologram is obtained.

31. Method according to claim 1, characterised in that aberrations have beforehand eliminated from said digitalised hologram by numerical processing.

32. Method according to claim 1, characterised in that a reference-digitalised hologram has been beforehand subtracted from said digitalised hologram.

33. Method according to claim 32, characterised in that said reference digitalised hologram is the hologram of a flat surface registered under the same conditions of registration of the hologram of said at least one object portion.

34. Method according to claim 1, characterised in that method is carried out simultaneously for more than one object portion.

35. Method according to claim 34, characterised in that resolution of MD matrix of at least one of said more than one portion is different from at least one of the resolutions of the other corresponding MD matrixes.

36. Method according to claim 1, characterised in that A, B, C, D, E, F, method steps are repeated for more than one wavelength of the light used for obtaining digitalised hologram, or equivalently for two or more digitalised hologram obtained at different wavelengths, resolution of all bidimensional matrix $IMd_k$ for each digitalised hologram and for all values of k between 1 and $N_{SD}$, being identical to the MD matrix resolution of distance values, MD matrix being extracted starting from at least one of the digitalised holograms corresponding to said different wavelengths, three-dimensional intensity images of said object or of said object portion being the juxtaposition of the three-dimensional images reconstructed starting from said more than one digitalised holograms.

37. Computer readable medium having a computer program configured to execute, when operating on a processor, the method according to claim 1.

38. Memory support readable by a processor, having a program memorized, characterised in that the program is the computer program according to claim 37.

39. Apparatus for revealing holographic images, particularly a holographic microscope, comprising a unit for processing the digitalised hologram, characterised in that the processing unit processes data revealed employing the method according to claim 1.

* * * * *